G. W. STANLEY.
DIFFERENTIAL HUB.
APPLICATION FILED FEB. 13, 1909.
993,563.
Patented May 30, 1911.
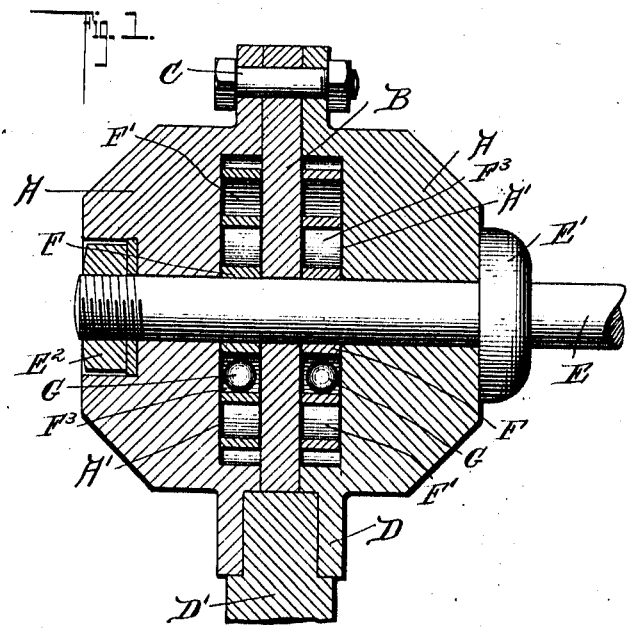
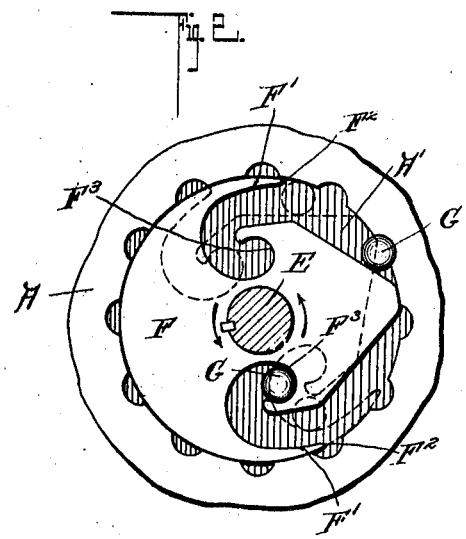
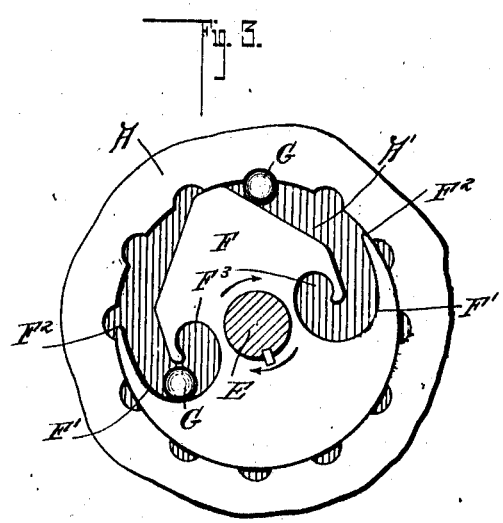
Witnesses
Philip H. Burch
Inventor
G. W. Stanley,
By O'Meara & Brock
Attorneys

UNITED STATES PATENT OFFICE.

GEORGE W. STANLEY, OF LOGANSPORT, INDIANA, ASSIGNOR OF ONE-EIGHTH TO ZACHRA TAYLOR, ONE-EIGHTH TO DAWS TAYLOR, ONE-EIGHTH TO CLARK M. TAYLOR, ONE-EIGHTH TO JOSEPH TAYLOR, AND ONE-FOURTH TO E. D. MORGAN, ALL OF LOGANSPORT, INDIANA.

DIFFERENTIAL HUB.

993,563.  Specification of Letters Patent.  Patented May 30, 1911.

Application filed February 13, 1909. Serial No. 477,635.

*To all whom it may concern:*

Be it known that I, GEORGE W. STANLEY, a citizen of the United States, residing at Logansport, in the county of Cass and State of Indiana, have invented a new and useful Improvement in Differential Hubs, of which the following is a specification.

This invention relates to differential hubs for automobiles, the object being to provide a hub which is so constructed that it will allow the outside wheels of an automobile when turning a corner to revolve faster than the inside wheels whereby skidding is prevented.

A still further object of my invention is to provide the axle with arrow-headed members which work in internally fluted hubs which are locked by balls when the axle is driven in either direction, said balls being so arranged that they will be thrown out of engagement with the members when the wheel revolves faster than the axle.

A still further object of the invention is to provide a differential hub which will take the place of the differential gear now in use on automobiles and other vehicles of this character whereby the wheels can be driven in such a manner that any one of the wheels can turn faster than the driving axle.

A still further object of my invention is to provide each of the wheels carried by the driving axle on an automobile with two pairs of locking balls which are so mounted within the wheel that two of the same will be locked when the wheel is being driven forwardly and the other two when the wheel is being driven backwardly, said balls working by gravity.

A further object of the invention is to provide a ball and socket locking device in which the balls are so mounted within the fluted hub that they will work in unison so that a double locking device is formed whereby all danger of the wheels slipping is prevented and at the same time the wheels are allowed to run faster than the axle.

A further object of the invention is to provide a ball and socket locking device which comprises arrow-headed members which work in fluted hubs in connection with balls whereby the balls will be picked up by points formed to each side of the arrow-headed members which will release the balls and will allow the hub to rotate faster than the axle so that in turning a corner the outside wheel can travel faster than the inside wheel and as soon as the machine is driven straight again the balls will be locked in their normal positions.

With these objects in view, my invention consists of the novel features of construction, combination and arrangement of parts hereinafter described, pointed out in the claims and shown in the accompanying drawings, in which, Figure 1 is a vertical section through my improved hub. Fig. 2 is a face view of one of the sections of the hub showing the ball in a locked position for driving the hub forwardly and, Fig. 3 is a similar view showing the ball in a locked position for driving the hub backwardly.

In carrying out my invention, I employ a hub A which is formed of two duplicate sections having annular recesses A' which are fluted, said flutes being in alinement with each other for the purpose hereinafter fully described. The sections of the hub are provided with flanges and arranged between the sections is a plate B which is secured between the same by bolts C which pass through flanges of the hub sections and through the plate so as to securely lock the members together and at intervals the flanges of the hub sections are provided with spoke sockets as clearly shown at D into which the spokes D' are adapted to be secured but it is of course understood that various other forms of spoke sockets can be used in connection with this hub, this special form being merely shown so as to illustrate how the spokes could be secured therein as in different constructions of axles it will require different spoke sockets to suit the same.

The hub is mounted on an axle E in the ordinary manner which is provided with a collar E' and is secured thereon by a nut E² which allows the same to rotate thereon. It is of course understood that one of these special constructed hubs is placed at each end of the driving axle of an automobile so that the same power will be applied to each of the wheels. Secured on the axle within each of the recesses formed in the hub are arrow-headed members F which are provided with curved projections or finger portions F' terminating in pointed ends F² upon opposite sides of the arrow-heads for the purpose hereinafter fully described, and which are of such a size that they will fit snugly within the recesses of the hub.

Intermediate the oppositely disposed inclined faces of the arrow heads and the curved projections of finger portions, I preferably provide recesses or pockets F³, said recesses or pockets being adapted to receive balls F which are adapted to be locked within the flutes of the hub by the arrow shaped members so that when the axle is revolved the hub will be securely locked to the same by the balls and it can be readily seen that by having two sets of balls as clearly shown and having the flutes of the hub arranged in alinement two balls will be in a locked position at the same time and the other two will remain in two of the pockets F³. As the wheel is being driven by the axle when a corner is turned the outside wheel starts to travel faster than the axle, the ball which was in a locked position will assume the position as shown in dotted lines in Fig. 2 so as to allow the wheel to overrun whereby skidding is prevented and as soon as the automobile is driven straight again the arrow-head will engage the ball and lock the same in the flute without any lost motion. When the driving axle is reversed one of the points F² picks up the balls which have been locked within the flutes on the forward motion and carries the same into the pockets F³ when the same is being driven forwardly. The arrow headed members are preferably keyed on the axle as clearly shown but it is of course understood that various other manners of securing the same thereon can be used if desired.

It will be seen that by providing both of the driving wheels of an automobile with hubs of this character each of the wheels will be locked to the driving axle by two balls on either the forward or rear movement so that if one of the balls should become worn so that it would allow the arrow-headed member to force the same out of the pocket the other ball would lock the wheel thereto whereby it is almost impossible for the hub to slip on the axle. It will also be seen that when the axle is reversed in either direction the points pick up the balls which have been locked in the respective flutes and carry them to the pockets and as the hub is rotated the balls are held therein out of use. As soon as the wheel starts to rotate faster than the axle the ball drops out of the flute which releases the hub and allows the same to rotate free on the axle which will prevent the skidding of automobiles in rounding corners and at the same time increases the life of the tires.

From the foregoing description it will be seen that I have provided a hub which is exceedingly simple and cheap in construction and one which is composed of very few parts which are so arranged and connected together that any one of the parts can be readily replaced when it becomes worn.

What I claim is:—

1. In a device of the kind described, the combination with an axle, of a hub revolubly mounted thereon, a member arranged within the hub and fixed upon the axle, said member having oppositely disposed inclined faces and oppositely disposed curved fingers or projections; and balls arranged within the hub and adapted to be locked in engagement therewith by either incline face, and disengaged by either curved projection.

2. In a device of the kind described the combination with an axle, of a hub loosely mounted on said axle provided with a fluted recess, an arrow-headed member fixed on said axle within said recess provided with points to each side of the head and balls arranged within said recess for locking said arrow-headed member to said hub.

3. In a device of the kind described the combination with an axle, of a hub mounted on said axle provided with a fluted recess, an arrow-headed member fixed on said axle within said recess provided with sockets and points, and balls arranged within said recess co-acting with said arrow-headed member in such a manner that one of said balls will be locked in one of the flutes when the same is being driven in either direction and the other ball will be held within the socket.

4. In a device of the kind described the combination with an axle, provided with an arrow-headed member of a hub loosely mounted on said axle provided with a fluted recess to receive said arrow-headed member, balls arranged within said recess for locking said arrow-headed member to the hub and points carried by said arrow-headed member for releasing said balls.

5. The combination with an axle, of a sectional hub revolubly mounted thereon, said hub having a central partition and annular recesses upon opposite sides thereof, of members arranged within said recesses and fixed upon the axle, together with balls contained in each recess, each member having oppositely disposed inclined faces adapted to force the balls into locking engagement with the hub, and oppositely disposed curved projections for disengaging said balls from the hub, each member having recesses or pockets arranged intermediate the inclined faces and curved projections for the purpose specified.

GEORGE W. STANLEY.

Witnesses:
 JOSEPH TAYLOR,
 E. D. MORGAN.